(12) United States Patent
Zhang

(10) Patent No.: US 10,894,719 B2
(45) Date of Patent: Jan. 19, 2021

(54) GRAPHENE MATERIAL PRODUCTION DEVICE AND SYSTEM

(71) Applicant: Linde Zhang, Shenzhen (CN)

(72) Inventor: Linde Zhang, Shenzhen (CN)

( * ) Notice: Subject to any disclaimer, the term of this patent is extended or adjusted under 35 U.S.C. 154(b) by 207 days.

(21) Appl. No.: 16/316,040

(22) PCT Filed: Jun. 29, 2017

(86) PCT No.: PCT/CN2017/090726
§ 371 (c)(1),
(2) Date: Jan. 8, 2019

(87) PCT Pub. No.: WO2018/006747
PCT Pub. Date: Jan. 11, 2018

(65) Prior Publication Data
US 2020/0354221 A1   Nov. 12, 2020

(30) Foreign Application Priority Data

Jul. 8, 2016 (CN) .......................... 2016 1 0535027

(51) Int. Cl.
*B01J 19/00* (2006.01)
*B01J 19/10* (2006.01)
(Continued)

(52) U.S. Cl.
CPC ......... *C01B 32/184* (2017.08); *B01J 19/0013* (2013.01); *B01J 19/10* (2013.01)

(58) Field of Classification Search
CPC .... B01J 19/00; B01J 19/0006; B01J 19/0013; B01J 19/10; B01J 19/24; C01B 32/00; C01B 32/15; C01B 32/182; C01B 32/184
See application file for complete search history.

(56) References Cited

U.S. PATENT DOCUMENTS 8,226,902 B2 *  7/2012  Jang ...................... C01B 32/162
                                                                    422/650
2016/0031712 A1   2/2016  Moon et al.

FOREIGN PATENT DOCUMENTS

CN    103435030 A  * 12/2013
CN    204917982 U    12/2015
(Continued)

OTHER PUBLICATIONS

Machine translation of CN 106430157 A, published on Feb. 22, 2017. (Year: 2017).*

(Continued)

*Primary Examiner* — Natasha E Young
(74) *Attorney, Agent, or Firm* — Bayramoglu Law Offices LLC

(57) ABSTRACT

Disclosed are a graphene material production device and a system including the device. The device includes: a first reaction component, a second reaction component and a negative pressure generating component. The first reaction component includes a first reaction chamber and a first material outlet arranged at a bottom of the first reaction chamber. The second reaction component includes a second reaction chamber and a second material inlet. A connecting passage between the first material outlet and the second material inlet is provided with a valve. A suction hole of the negative pressure generating component is provided inside the second reaction chamber. The use of the device in the process of producing a graphene material by a redox method can overcome the problem that the viscous material is difficult to transfer, thereby reducing the production difficulty and effectively improving the production efficiency of graphene materials.

20 Claims, 3 Drawing Sheets

(51) Int. Cl.
    *B01J 19/24*           (2006.01)
    *C01B 32/15*           (2017.01)
    *C01B 32/184*         (2017.01)

(56)                 References Cited

FOREIGN PATENT DOCUMENTS

| CN | 105692605 A | * | 6/2016 |
| CN | 106006626 A | | 10/2016 |
| CN | 106430157 A | * | 2/2017 |
| CN | 205973808 U | | 2/2017 |

OTHER PUBLICATIONS

Machine translation of CN 105692605 A, published on Jun. 22, 2016. (Year: 2016).*

Machine translation of CN 103435030 A, published on Dec. 11, 2013. (Year: 2013).*

* cited by examiner

GRAPHENE MATERIAL PRODUCTION DEVICE AND SYSTEM

CROSS REFERENCE TO RELATED APPLICATIONS

This application is the national phase entry of International Application No. PCT/CN2017/090726, now WO2018006747, filed on Jun. 29, 2017, which is based upon and claims priority to Chinese Patent Application No. 201610535027.X, filed on Jul. 8, 2016, and the entire contents of which are incorporated herein by reference.

TECHNICAL FIELD

The present invention relates to the technical field of chemical industry, in particular to a graphene material production device and system.

BACKGROUND

Graphene material is a two-dimensional material. With its excellent physical and structural properties, the graphene material shows an extraordinary application potential in many fields such as electronics, sensing, optoelectronic devices, etc. The preparation methods for the graphene are mainly classified as physical method and chemical method. The physical method includes mechanical exfoliation method, epitaxy method, etc. The chemical method includes chemical vapor deposition method, epitaxial growth method, and graphite oxide reduction method, etc. Most of the existing graphene materials are prepared by a redox method. The preparation for the graphene material by the redox method has advantages such as simple operations, the products have good processability, low production cost, etc., which is suitable for large-scale production of graphene powder or solution product. However, the material is rather viscous and it is not easy to transfer the material in the process of preparing the graphene by the redox method, which increases the production difficulty in the production process and affects the production efficiency of the graphene.

SUMMARY

In view of the above problems, the present invention provides a graphene material production device, which is used to produce graphene material, and enables the viscous material to be transferred among the reactors simply and efficiently, thereby reducing the production difficulty and improving the production efficiency of the graphene.

The present invention provides a graphene material production device, including: a first reaction component, a second reaction component and a negative pressure generating component.

The first reaction component includes a first reaction chamber and a first material outlet arranged at a bottom of the first reaction chamber. The second reaction component includes a second reaction chamber and a second material inlet.

A connecting passage between the first material outlet and the second material inlet is provided with a valve.

A suction hole of the negative pressure generating component is provided inside the second reaction chamber.

Preferably, the second material inlet is provided at a top of the second reaction chamber, and the connecting passage of the first material outlet and the second material inlet is configured to have a minimum length.

Preferably, the first reaction component includes a first agitation mechanism.

The first agitation mechanism includes a first agitator of a helical ribbon type, and the first agitator is provided inside the first reaction chamber.

Preferably, the first reaction component further includes a temperature detecting device, and a detecting end of the temperature detecting device is provided inside the first reaction chamber.

Preferably, the detecting end of the temperature detecting device is configured inside the first agitator.

Preferably, the second reaction component includes a second agitation mechanism.

The second agitation mechanism includes a second agitator of an impeller type, and the second agitator is provided inside the second reaction chamber.

Preferably, the second reaction chamber includes a second material outlet.

The second material outlet is arranged at a side wall or a bottom of the second reaction chamber.

Preferably, the first reaction component includes an ultrasonic dispersion component.

The ultrasonic dispersion component includes an ultrasonic liquid tank and an ultrasonic generator.

The ultrasonic liquid tank is sleeved outside the first reaction chamber.

The ultrasonic generator is arranged on an outer surface of the ultrasonic liquid tank.

Preferably, the first reaction component includes a first temperature adjusting coil pipe and a first heating component, and the second reaction component includes a second temperature adjusting coil pipe and a second heating component.

The first temperature adjusting coil pipe is sleeved around a periphery of the first reaction chamber, and the first temperature adjusting coil pipe is configured to accommodate a temperature adjusting liquid. The first heating component is configured to heat a material inside the first reaction chamber.

The second temperature adjusting coil pipe is sleeved around a periphery of the second reaction chamber, and the second temperature adjusting coil pipe is configured to accommodate the temperature adjusting liquid. The second heating component is configured to heat a material inside the second reaction chamber.

The present invention further provides a graphene material production system provided with the above-mentioned graphene material production device.

Compared with the prior art, the present invention has the following technical effects.

The present invention provides a graphene material production device. The first reaction chamber of the first reaction component is configured to hold materials. After the implementation of the reaction process over the materials in the first reaction chamber is completed, the valve is opened. Under the influence of gravity, the materials move toward the second material inlet through the first material outlet provided at the bottom of the first reaction chamber, and enter into the second reaction chamber of the second reaction component from the second material inlet to get ready for a next step of the process. At this time, the negative pressure generating component is started, and the air is continuously extracted from the suction hole, so that a pressure of the second reaction chamber is lower than a pressure of the first reaction chamber. The second reaction chamber generates a vacuum suction force against the first reaction chamber due to the pressure difference, and the material is inhaled and transferred from the first reaction chamber to the second reaction chamber. The material transfer is completed under the combined action of the gravity and negative pressure suction force, thereby reducing the difficulty of transferring the viscous material. The device has a wide application range and has a good transfer effect for various materials. In particular, in the preparation of graphene material by the redox method, the intermediate reaction products have a high viscosity. The use of the device in the process of producing graphene material by a redox method can overcome the problem of difficulty in transferring the viscous material, thereby reducing the production difficulty and effectively improving the production efficiency of graphene materials.

BRIEF DESCRIPTION OF THE DRAWINGS

The drawings are used to provide a further understanding of the present invention. The illustrative embodiments of the present invention and the description thereof are used to explain the present invention, and do not constitute an undue limitation of the present invention. In the drawings.

Figure 1:
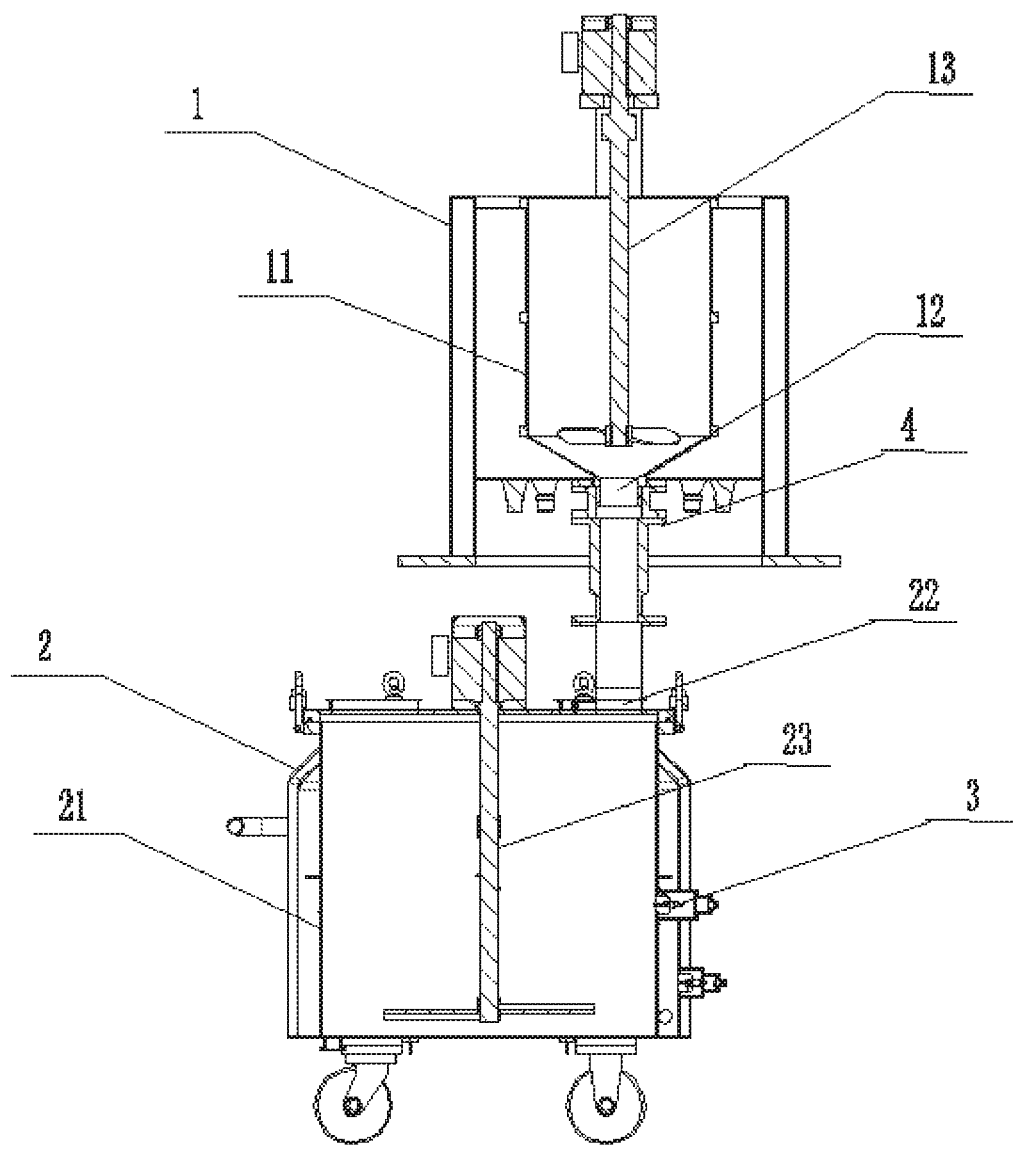
FIG. 1 is a structural schematic diagram of a graphene production device according to an embodiment of the present invention.

DESCRIPTION OF THE REFERENCE DESIGNATORS 1 first reaction component; 2 second reaction component;
3 negative pressure generating component; 4 valve;
11 first reaction chamber; 12 first material outlet;
21 second reaction chamber; 22 second material inlet;
13 first agitation mechanism; 131 first agitator;
14 temperature detecting device; 23 second agitation mechanism;
231 second agitator; 15 ultrasonic dispersion component;
151 ultrasonic liquid tank; 152 ultrasonic generator;
16 first temperature adjusting coil pipe; 17 first heating component;
25 second temperature adjusting coil pipe; and 26 second heating component.

DETAILED DESCRIPTION OF THE EMBODIMENTS

It should be noted that the embodiments of the present invention and the features of the embodiments may be combined with each other without conflict. The present invention will be described below in detail with reference to the drawings in combination with the embodiments.

In the process of producing graphene material by redox method, the graphite is oxidized into graphite oxide by using strong oxidant such as concentrated sulfuric acid, concentrated nitric acid, potassium permanganate, etc. In the oxidation process, some oxygen-containing functional groups are inserted into the graphite layers, so that the spacing of the graphite layers is increased. Then, after being subjected to sonication for a period of time, single-layer or multi-layer graphene oxide can be formed. After that, the graphene oxide is reduced to graphene by a strong reductant such as hydrazine hydrate, sodium borohydride, etc. The intermediate product produced by the above reaction has a high viscosity, and the transfer of such a high-viscosity material in the overall graphene production process increases the difficulty for a continuous production process.

The present invention provides a graphene material production device, including: a first reaction component 1, a second reaction component 2 and a negative pressure generating component 3.

The first reaction component 1 includes a first reaction chamber 11 and a first material outlet 12 arranged at a bottom of the first reaction chamber 11. The second reaction component 2 includes a second reaction chamber 21 and a second material inlet 22.

A connecting passage between the first material outlet 12 and the second material inlet 22 is provided with a valve 4.

A suction hole of the negative pressure generating component 3 is provided inside the second reaction chamber 21.

The device has a good effect on transferring the materials in the process of producing graphene material, especially for transferring the viscous solid-liquid material, and is particularly suitable for large-scale continuous production of graphene materials based on the redox method.

Referring to FIG. 1, the figure shows the structure of a graphene material production device according to an embodiment of the present invention.

The first reaction chamber 11 of the first reaction component 1 is configured to hold a material. After the implementation of the reaction process for the material in the first reaction chamber 11 is completed, the valve 4 is opened. Under the influence of gravity, the material moves toward the second material inlet 22 through the first material outlet 12 provided at the bottom of the first reaction chamber 11, and enters into the second reaction chamber 21 of the second reaction component 2 from the second material inlet 22 to get ready for the next step of the process. At this time, the negative pressure generating component 3 is started, and the air is continuously extracted from the suction hole, so as to make the pressure of the second reaction chamber 21 lower than the pressure of the first reaction chamber 11. The second reaction chamber 21 generates a vacuum suction force against the first reaction chamber 11 due to the pressure difference, and the material is inhaled and transferred from the first reaction chamber 11 to the second reaction chamber 21. The transfer of material is completed under the combined action of gravity and the negative pressure suction force, thereby reducing the difficulty of transferring the viscous material. The device has a wide application range and has a good transfer effect on various materials. In particular, in the process of preparing graphene materials by the redox method, the intermediate reaction products have high viscosity, and the use of the device in the process of producing graphene materials by the redox method can overcome the problem that the viscous material is difficult to transfer, thereby reducing the production difficulty and effectively improving the production efficiency of graphene materials.

The first reaction chamber 11 and the second reaction chamber 21 may be made of a metal material such as stainless steel. For some corrosive material systems (such as graphite-inorganic strong protonic acid system), or the case that the subsequent chemical reaction requires the addition of corrosive raw materials (such as $KMnO_4$), the corrosion resistance of metal materials is poor. If the metal materials are used to make the reaction container, the reaction container gets corroded easily, thereby affecting the service life of the device. This problem can be solved by adding an anti-corrosion coating on the inner wall of the reaction chamber, and preferably, the anti-corrosion coating is a polytetrafluoroethylene coating or polypropylene coating. Polytetrafluoroethylene or polypropylene can resist against the corrosion of strong acid and alkali, and thus can effectively prolong the service life of the device. In addition, since the material of the intermediate product in the process of producing graphene by the redox method has high viscosity, a serious material loss is caused due to the phenomenon of wall sticking in each material transfer, thereby causing a decline in the yield of graphene products. Another advantage of using polytetrafluoroethylene is that the coating is very smooth, which improves the phenomenon of the wall sticking of the material, reduces the loss of the material during the transfer process, and thus increases the yield of the graphene material.

Preferably, the second material inlet 22 is provided at the top of the second reaction chamber 21, and the connecting passage of the first material outlet 12 and the second material inlet 22 is configured to have a minimum length. Specifically, the first reaction component 1 is arranged at a higher place to make the first material outlet 12 higher than the second material inlet 22 of the second reaction component 2, and thus the first reaction chamber 11 is higher than the second reaction chamber 21. The first material outlet 12 is arranged at the bottom of the first reaction chamber 11, and the second material inlet 22 is arranged at the top of the second reaction chamber 21. The first material outlet 12 and the second material inlet 22 are connected by a pipeline. The pipeline is configured to have a minimum length, and the valve 4 is arranged on the pipeline to form the minimum transporting distance. The opening and closing of the material transfer passage is controlled by switching the valve 4.

When the material needs to be transferred after the reaction, the valve 4 is opened, and the negative pressure generating component 3 is activated to start air extraction. A pressure difference is formed between the second reaction chamber 21 and the first reaction chamber 11, thereby forming a suction force against the material. On one hand, the material will move under the vacuum suction force formed by the pressure difference between the two reaction chambers, and on the other hand, the material will flow downward due to gravity. These two assisting powers simultaneously promote the material transfer. What's more, since the passage between the two reaction components is configured to have the minimum transporting distance, a better transfer effect is achieved, the difficulty of transferring high-viscosity materials is further reduced, and the production efficiency of the graphene materials is improved.

Further, the first reaction component 1 includes a first agitation mechanism 13.

The first agitation mechanism 13 includes a first agitator 131 of a helical ribbon type, and the first agitator 131 is provided inside the first reaction chamber 11.

Figure 2:
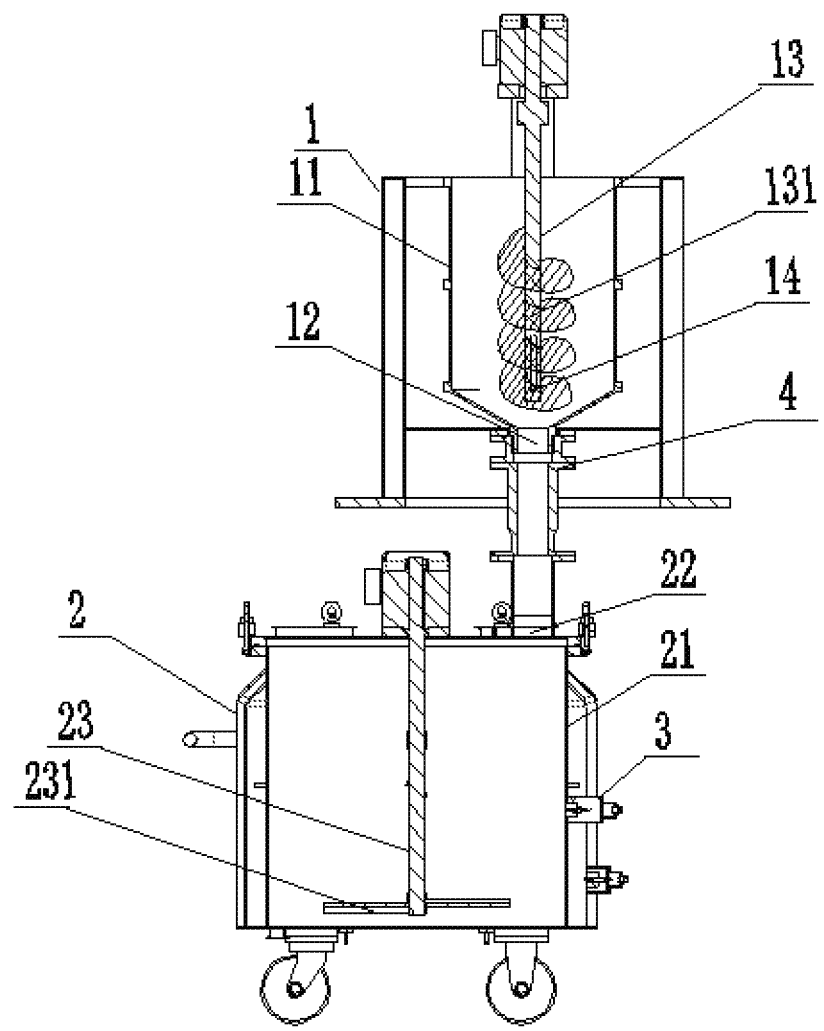
FIG. 2 is a structural schematic diagram of a graphene production device according to another embodiment of the present invention.

FIG. 2 shows the structure of a graphene material production device according to another embodiment of the present invention for reference.

It can be understood by those skilled in the art that many chemical reactions, especially liquid phase reactions, need to be proceeded while performing dispersion and stirring or proceeded immediately after dispersion in order to prevent re-agglomeration of the dispersed material. Therefore, the production device provided by the embodiments of the present invention can be used not only for material reaction but also for dispersion and stirring, and particularly used as a device for dispersing and exfoliating the graphite oxide. For example, the device can be used as a dispersion device for graphite pretreatment, and a device for graphite oxidation intercalation, etc. Therefore, the graphene production device provided by the present invention includes a first agitation mechanism 13. The first agitation mechanism 13 may be a first agitator 131 of a helical ribbon type. The first agitator 131 can not only perform the reaction while stirring, but also improve the uniformity of the liquid phase reaction. The stirring blade of the helical ribbon type can also generate a thrust to push the material downward while rotating and stirring. That is to say, in the present embodiment, when the material is transferred into the second reaction chamber 21, the material moves downward under the combined action of vacuum suction force, stirring thrust and gravity, so the present invention has a better transfer capability for the high-viscosity material, and the production efficiency of the graphene materials is further improved.

Further, in the production of graphene materials by chemical method, especially by the redox method, reaction reagents have strong oxidation and reduction such as strong acid, strong alkali, etc. are used. Since the temperature changes greatly during the redox process, for the sake of timely understanding the temperature in the first reaction chamber 21 by the operator, the graphene material production device provided in the present embodiment further preferably includes a temperature detecting device 14. The detecting end of the temperature detecting device 14 is arranged inside the first reaction chamber 11 to detect the temperature of the material system in the cavity of the first reaction chamber 11. The temperature detecting device may be a thermometer, a temperature sensor or the like. The temperature detecting device 14 is provided to help the operator to know the temperature of the material in the dispersion chamber in time, and to provide a basis for the operator to perform the operation of adjusting the temperature in the first reaction chamber 11 in time, thereby avoiding the occurrence of an accident as well.

Optionally, the detecting end of the temperature detecting device 14 is provided inside the first agitator 131. Preferably, the temperature detecting end, such as a thermometer or a temperature sensor, is arranged inside the stirring shaft of the first agitator 131. By doing so, not only can the real-time detection of the material temperature in the reaction chamber be realized to facilitate the controlling of the material reaction process by the operator, but also the collision between the blade of the first agitator 131 with the detection end during the stirring process is avoided, thereby further improving the safety and reliability of the graphene production device.

It is well known to those skilled in the art that the preparation of graphene materials by chemical method usually involves a plurality of chemical reactions, and each reaction requires an independent operation. Therefore, the present graphene material production device includes a second reaction component 2. The material is transferred to the second reaction component 2 after completion of the reaction in the first reaction component 1 for the next reaction. The second agitator 23 of an impeller type is provided inside the second reaction chamber 21 of the second reaction component 2, which can effectively stir the materials in the second reaction chamber 21 rapidly and evenly, thereby facilitating the acceleration of material dispersion and improving the uniformity of the reaction. Preferably, multiple sets of the stirring impellers may be configured for the second agitator 231 to increase the mixing uniformity and improve the stirring efficiency, thereby further improving the reaction uniformity.

The other function of the first agitator 131 and the second agitator 231 is to balance the sudden increase or decrease in the local heat of the reaction material to achieve the effect of rapid temperature transfer. The temperature in the reaction chamber is evenly distributed, which further improves the safety and reliability of the graphene material production device.

In addition, the second reaction chamber 21 includes a second material outlet. The second material outlet is provided at a side wall or a bottom of the second reaction chamber 21 in order to facilitate discharge of the graphene material product. When the redox reaction is completed, the graphene material can be directly discharged from the second material outlet, so it is convenient for the operator to collect.

It should be understood by those skilled in the art that after the redox reaction is completed, the graphene material should further be subjected to the processes of separation and drying. Therefore, the second material outlet may be connected to the interface of the separation and drying device to continue the subsequent processes in producing the graphene material.

In the production and preparation of the graphene material by the redox method, since the single-layer graphene is very thin and easy to get agglomerated, a continuous stirring is required to disperse the single-layer graphene in the reaction process. Therefore, the graphene production device further includes an ultrasonic dispersion component 15 which utilizes the superior vibration dispersion capability of the ultrasonic wave in the liquid medium to complete the dispersion of the material during the redox reaction of the graphene.

Figure 3:
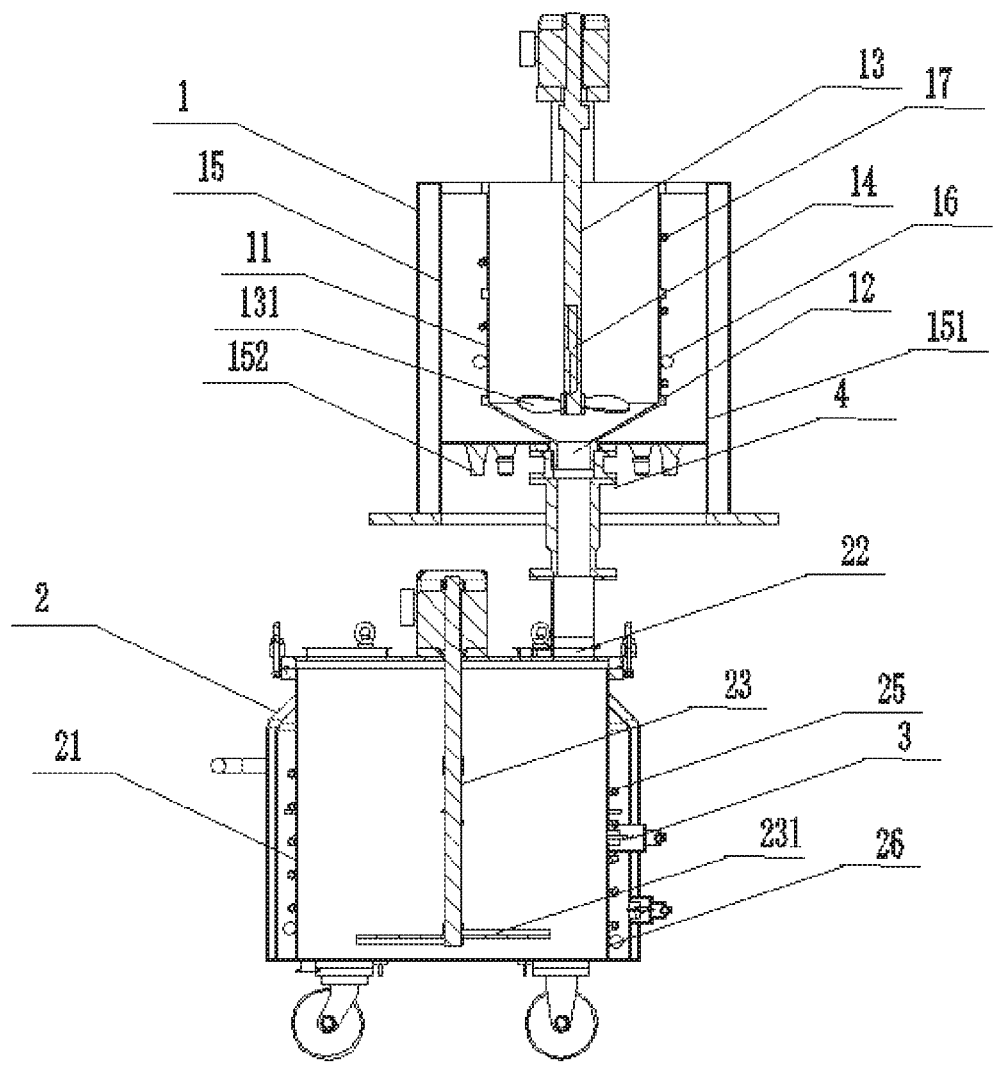
FIG. 3 is a structural schematic diagram of a graphene production device according to yet another embodiment of the present invention.

FIG. 3 shows the structure of a graphene material production device according to another embodiment of the present invention for reference.

The ultrasonic dispersion component 15 includes an ultrasonic liquid tank 151 and an ultrasonic generator 152. The ultrasonic liquid tank 151 is sleeved outside the first reaction chamber 11. The ultrasonic generator 152 is arranged on an outer surface of the ultrasonic liquid tank 151. The ultrasonic liquid tank 151 is configured to hold a liquid medium, and the liquid medium is used for conducting ultrasonic waves. The ultrasonic generator 152 may be a conventional ultrasonic oscillator currently available on the market. The ultrasonic oscillator transmits ultrasonic waves into the first reaction chamber 11 through the ultrasonic medium by contacting with the outer surface of the first reaction chamber 11 to ultrasonically disperse the material in the first reaction chamber 11. Specifically, a plurality of ultrasonic generators 152 may be provided according to the shape of the first reaction chamber 11 and the requirements of the production conditions to meet the production requirements of the graphene material.

Further, in order to facilitate the addition of the liquid medium to the ultrasonic liquid tank 151, an inlet may be provided in the side wall of the ultrasonic liquid tank 151, and the inlet is connected to the inside of the ultrasonic liquid tank 151. By doing so, the ultrasonically conductive liquid medium can enter the ultrasonic liquid tank 151 through the inlet. In addition, a vent may further be provided. The vent is connected to the inside of the ultrasonic liquid tank 151 for discharging the ultrasonic medium liquid, and the vent may be provided with a valve. Of course, the ultrasonic liquid tank 151 may also be preferably provided with an outlet. The outlet is connected to the inside of the ultrasonic liquid tank 151. The outlet is disposed above the inlet to function as an overflow port. Or, more preferably, a liquid level detecting device may be provided to automatically stop the injection of the ultrasonic medium or issue an alarm to alert the operator when the liquid level detecting device detects that the liquid exceeds the maximum liquid level.

The graphene material production device is capable of using the ultrasonic dispersion component 15 in cooperation with the first agitation mechanism 13 while performing ultrasonic stirring and mechanical stirring. During the process of stirring and dispersing, the ultrasonic generator 152 emits ultrasonic waves, and the ultrasonic waves are transmitted to the inside of the material in the first reaction chamber 11 through the ultrasonic medium to achieve the effect of ultrasonic vibration and dispersion. The mechanical stirring force applied by the agitator helps to accelerate the flow of the material in order to promote the transmission of the ultrasonic waves, especially for viscous materials (such as graphite oxide-water material), it is helpful to improve the contact between the ultrasonic waves and the material, thereby improving the uniformity of material dispersion, and avoiding the uncontrolled reaction caused by local overheating of the material. Therefore, the production device provided by the embodiment of the present invention has a wide application range, a uniform dispersing effect on various materials, especially viscous solid-liquid materials, and high safety in use. Its application in the preparation of graphene materials will help to improve the uniformity of solid materials dispersed in the liquid medium, and also help to achieve a complete reaction of the materials, thereby improving the uniformity of product quality.

Further, in the reaction process of the production of the graphene material, the temperature of the material tends to suddenly get high or low, for two reasons. On one hand, the redox reaction usually releases a large amount of heat, which causes a rapid increase on the temperature of the material. On the other hand, the interaction between the ultrasonic waves and the material causes a sudden increase in the temperature of the material in the dispersion chamber, and for some reactions, the temperature generated by the ultrasonic waves tends to be excessively high or low, which adversely affects the smooth progress of the reaction. Therefore, it is necessary to adjust the temperature of the material in the first reaction chamber 11 in order to control the reaction rate. The first reaction component 1 of the present invention is provided with a first temperature adjusting coil pipe 16 and a first heating component 17. The first temperature adjusting coil pipe 16 is sleeved around the periphery of the first reaction chamber 1, and the first heating component 17 is used for heating the material inside the first reaction chamber 11. Specifically, in order to achieve a better temperature adjusting effect, the first temperature adjusting coil pipe 16 can be arranged close to the sidewall and/or the bottom of the first reaction chamber 11. The first temperature adjusting coil pipe 16 is configured to lower the temperature in order to prevent adverse effects caused by excessive temperature during the ultrasonic process. The first heating component 17 is configured to increase the temperature during the ultrasonic process, so as to increase the reaction speed. By using the first temperature adjusting coil pipe 16 and the first heating component 17 in cooperation, the intention to adjust the material reaction temperature of the first reaction chamber 11 can be achieved. The first temperature adjusting coil pipe 16 is configured to accommodate the temperature adjusting liquid. Of course, the first temperature adjusting coil pipe 16 is also provided with an inlet and an outlet for the injection and discharge of the temperature adjusting liquid. The heat in the first reaction chamber 11 is carried away by the flow of the temperature adjusting liquid. For example, in the process of intercalating and oxidizing graphite, the heat released by the oxidation reaction and the heat released by the interaction between the ultrasonic waves and the material is excessive, which may cause an excessive reaction rate. At this time, cold water is introduced into the first temperature adjusting coil pipe 16, and the heat of the material in the first reaction chamber 11 is taken away by controlling the flow of cold water in the first temperature adjusting coil pipe 16. Therefore, the intention of adjusting the temperature in the cavity of the first reaction chamber 11 is achieved, the effect of controlling the reaction rate is achieved, and the quality of the product is further stabilized.

Also, for the purpose of adjusting the temperature of the material in the cavity of the second reaction chamber 21, the second reaction component 2 is provided with a second temperature adjusting coil pipe 25 and a second heating component 26. When the material is discharged too fast in the reaction process, it is easy to cause an excessive temperature, the second temperature adjusting coil pipe 25 is required to cool down. After the completion of the material discharging and the backwashing, the material needs to be kept at a certain temperature for a certain period of time, so that the second heating component 26 is required to heat and maintain the temperature.

The present invention further provides a graphene material production system including the above graphene material production device. Specifically, in order to achieve continuous production of the graphene material, the present invention may further include:

a purification device, configured to purify the graphite oxide solid-liquid mixture to obtain graphene oxide;

a drying device, configured to dry the graphene oxide material;

a pulverizing device, configured to pulverize the dried graphene oxide to obtain a graphene oxide powder; and a high-temperature reduction device, configured to reduce the graphene oxide powder to obtain the graphene powder.

Specifically, the second material outlet can be connected to the material inlet of the purification device to realize the continuous production of the graphene material.

The above-mentioned graphene material production system can be specifically used for preparing graphene and functionalized graphene, and the functionalized graphene includes graphene oxide, aminated graphene, carboxylated graphene, sulfonated graphene, mercapto graphene, cyanographene, nitrographene, borate-based graphene, phosphate-based graphene, hydroxylated graphene, methylated graphene, allylated graphene, trifluoromethylated graphene, dodecylated graphene, octadecylated graphene, graphene fluoride, graphene bromide, graphene chloride, graphene iodide, etc.

The foregoing are only the preferred embodiments of the present invention and are not intended to limit the present invention. Any modifications, equivalent substitutions, improvements, etc. derived within the spirit and scope of the present invention should all be considered as falling within the scope of the present invention.

What is claimed is:

1. A graphene material production device, comprising:
a first reaction component, a second reaction component and a negative pressure generating component;
wherein, the first reaction component comprises a first reaction chamber and a first material outlet arranged at a bottom of the first reaction chamber;
the second reaction component comprises a second reaction chamber and a second material inlet;
a connecting passage between the first material outlet and the second material inlet; and
a suction hole of the negative pressure generating component is provided inside the second reaction chamber.

2. The graphene material production device of claim 1, wherein the second material inlet is provided at a top of the second reaction chamber, and the connecting passage of the first material outlet and the second material inlet is configured to have a minimum length.

3. The graphene material production device of claim 2, wherein
the first reaction component comprises a first agitation mechanism; and
the first agitation mechanism comprises a first agitator of a helical ribbon type, and the first agitator is provided inside the first reaction chamber.

4. The graphene material production device of claim 3, wherein the first reaction component further comprises a temperature detecting device, and a detecting end of the temperature detecting device is provided inside the first reaction chamber 1.

5. The graphene material production device of claim 4, wherein the detecting end of the temperature detecting device is configured inside the first agitator.

6. The graphene material production device of claim 1, wherein
the second reaction component comprises a second agitation mechanism; and
the second agitation mechanism comprises a second agitator of an impeller type, and the second agitator is provided inside the second reaction chamber.

7. The graphene material production device of claim 6, wherein the second reaction chamber comprises a second material outlet; and
the second material outlet is arranged at a side wall or a bottom of the second reaction chamber.

8. The graphene material production device of claim 1, wherein
the first reaction component comprises an ultrasonic dispersion component;
the ultrasonic dispersion component comprises an ultrasonic liquid tank and an ultrasonic generator;
the ultrasonic liquid tank is sleeved outside the first reaction chamber; and
the ultrasonic generator is arranged on an outer surface of the ultrasonic liquid tank.

9. The graphene material production device of claim 8, wherein
the first reaction component comprises a first temperature adjusting coil pipe and a first heating component;
the second reaction component comprises a second temperature adjusting coil pipe and a second heating component;
the first temperature adjusting coil pipe is sleeved around a periphery of the first reaction chamber, and the first temperature adjusting coil pipe configured to accommodate a temperature adjusting liquid;
the first heating component is configured to heat a first material inside the first reaction chamber;
the second temperature adjusting coil pipe is sleeved around a periphery of the second reaction chamber, and the second temperature adjusting coil pipe is configured to accommodate the temperature adjusting liquid; and the second heating component is configured to heat a second material inside the second reaction chamber.

10. A graphene material production system comprising the graphene material production device claim 1.

11. The graphene material production device of claim 2, wherein the first reaction component comprises an ultrasonic dispersion component;

the ultrasonic dispersion component comprises an ultrasonic liquid tank and an ultrasonic generator;

the ultrasonic liquid tank is sleeved outside the first reaction chamber; and the ultrasonic generator is arranged on an outer surface of the ultrasonic liquid tank.

12. The graphene material production device of claim 3, wherein the first reaction component comprises an ultrasonic dispersion component;

the ultrasonic dispersion component comprises an ultrasonic liquid tank and an ultrasonic generator;

the ultrasonic liquid tank is sleeved outside the first reaction chamber; and the ultrasonic generator is arranged on an outer surface of the ultrasonic liquid tank.

13. The graphene material production device of claim 4, wherein the first reaction component comprises an ultrasonic dispersion component;

the ultrasonic dispersion component comprises an ultrasonic liquid tank and an ultrasonic generator;

the ultrasonic liquid tank is sleeved outside the first reaction chamber; and the ultrasonic generator is arranged on an outer surface of the ultrasonic liquid tank.

14. The graphene material production device of claim 5, wherein the first reaction component comprises an ultrasonic dispersion component;

the ultrasonic dispersion component comprises an ultrasonic liquid tank and an ultrasonic generator;

the ultrasonic liquid tank is sleeved outside the first reaction chamber; and the ultrasonic generator is arranged on an outer surface of the ultrasonic liquid tank.

15. The graphene material production device of claim 6, wherein the first reaction component comprises an ultrasonic dispersion component;

the ultrasonic dispersion component comprises an ultrasonic liquid tank and an ultrasonic generator;

the ultrasonic liquid tank is sleeved outside the first reaction chamber; and the ultrasonic generator is arranged on an outer surface of the ultrasonic liquid tank.

16. The graphene material production device of claim 7, wherein the first reaction component comprises an ultrasonic dispersion component;

the ultrasonic dispersion component comprises an ultrasonic liquid tank and an ultrasonic generator;

the ultrasonic liquid tank is sleeved outside the first reaction chamber; and the ultrasonic generator is arranged on an outer surface of the ultrasonic liquid tank.

17. The graphene material production system of claim 10, wherein the second material inlet is provided at a top of the second reaction chamber, and the connecting passage of the first material outlet and the second material inlet is configured to have a minimum length.

18. The graphene material production system of claim 10, wherein the first reaction component comprises a first agitation mechanism; and the first agitation mechanism comprises a first agitator of a helical ribbon type, and the first agitator is provided inside the first reaction chamber.

19. The graphene material production system of claim 10, wherein the first reaction component further comprises a temperature detecting device, and a detecting end of the temperature detecting device is provided inside the first reaction chamber.

20. The graphene material production system of claim 10, wherein the detecting end of the temperature detecting device is configured inside the first agitator.

* * * * *